United States Patent Office 3,012,039
Patented Dec. 5, 1961

3,012,039
2-p-CHLOROBENZYL-1,2-BENZISOTHIAZOLONE

John Selwyn Morley, Alderley Park, Macclesfield, England, assignor to Imperial Chemical Industries Limited, London, England, a corporation of Great Britain No Drawing. Filed Mar. 2, 1959, Ser. No. 796,283
Claims priority, application Great Britain Mar. 14, 1958
1 Claim. (Cl. 260—304)

This invention relates to new organic compounds and more particularly it relates to new 1:2-benzisothiazolone derivatives which possess useful antibacterial and antifungal activity.

According to the invention we provide 1:2-benzisothiazolone derivatives of the formula:

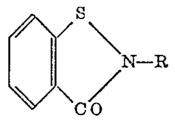

wherein R stands for an alkyl radical containing at least 4 carbon atoms; a benzyl radical substituted by halogen(s); a phenyl radical substituted by an alkyl radical or alkyl radicals containing a total of at least 2 carbon atoms, by halogen(s) and/or by alkoxy, amino and/or substituted amino groups; or a heterocyclic radical, optionally substituted by halogen and/or by alkyl radicals.

As suitable values of R where R stands for an alkyl radical containing not less than 4 carbon atoms there may be mentioned straight-chain alkyl radicals containing not less than 4 carbon atoms for example the butyl, dodecyl, cetyl, heptadecyl and octadecyl radicals and branched-chain alkyl radicals containing not less than 4 carbon atoms for example the tertbutyl radical.

As suitable values of R where R stands for a substituted benzyl radical there may be mentioned for example the o-chlorobenzyl, p-chlorobenzyl, 2:6-dichlorobenzyl and 2:4:5-trichlorobenzyl radicals.

As suitable values of R where R stands for a substituted phenyl radical there may be mentioned for example the p-n-butylphenyl, 2:4-dimethylphenyl, 2:6-dimethylphenyl, p-bromophenyl, o-chlorophenyl, m-chlorophenyl, p-chlorophenyl, 2:5-dichlorophenyl, 3:4-dichlorophenyl and p-methoxyphenyl radicals.

As a suitable value of R where R stands for a heterocyclic radical there may be mentioned for example the α-pyridyl, 5-bromo-α-pyridyl, δ-pyridyl and 2-pyrimidyl radicals.

Particularly valuable 1:2-benzisothiazolone derivatives are the compounds 2-p-n-butylphenyl-1:2-benzisothiazolone, 2-(2′:4′-dimethylphenyl)-1:2-benzisothiazolone, 2-(2′:6′-dimethylphenyl)-1:2-benzisothiazolone and 2-p-chlorobenzyl-1:2-benzisothiazolone.

According to a further feature of the invention we provide a process for the manufacture of the 1:2-benzisothiazolones of the invention which comprises condensing an o-halogenothiolbenzoyl halide of the formula:

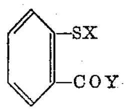

wherein X and Y stand for halogen atoms which may be the same or different with a primary amine of the formula $R.NH_2$ wherein R has the meanings stated above.

The condensation may conveniently be carried out by mixing the two reactants, preferably in an inert diluent or solvent or in a mixture of inert diluents or solvents and preferably with cooling. Preferred conditions comprise the carrying out of the condensation in the presence of an acid-binding agent which may conveniently be a tertiary amine, for example pyridine, or an excess of the amine reactant. As a suitable o-halogenothiolbenzoyl halide for use in the process there may be mentioned for example the known o-chlorothiolbenzoyl chloride which can conveniently be prepared for example in solution form by suspending 2:2′-dithiobenzoyl chloride in a suitable solvent for example carbon tetrachloride and treating the mixture with dry chlorine. After removal of any excess chlorine the resulting o-chlorothiolbenzoyl chloride solution may conveniently be used for interaction with the primary amines of the aforesaid formula or solutions thereof in suitable solvents or diluents for example water, pyridine, carbon tetrachloride and the like according to the process of the invention. Isolation of the o-halogenothiolbenzoyl halide starting material is thus seen not to be a necessary feature of the process of the invention and is indeed in most instances unnecessary.

According to a further feature of the invention we provide a process for the manufacture of the 1:2-benzisothiazolones of the invention which comprises the intramolecular condensation of an o-halogenothiolbenzamide of the formula:

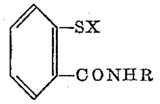

wherein X and R have the meanings stated above.

The said condensation may conveniently be carried out by the application of heat, preferably in the presence of a solvent or diluent for example glacial acetic acid; or by use of aqueous alkalis, or pyridine.

o-Halogenothiolbenzamides of the above formula are conveniently obtained from 2:2′-dithiobenzoyl halides or from esters of 2:2′-dithiobenzoic acid by condensing these with amines of the formula $R.NH_2$ wherein R has the meanings stated above and treating the resulting 2:2′-dithiobenzamides with halogens. It can thus be seen that the aforementioned processes are in effect alternative routes for the conversion of 2:2′-dithiobenzoic acid, and thus thiosalicylic acid, into the 1:2-benzisothiazolones of the invention. Other alternative processes of manufacture of the 1:2-benzisothiazolones of the invention which come within the same category are for example the process comprising disproportionation of the corresponding 2:2′-dithiobenzamides; interaction of 1:2:3-benzodithiole-3-one with amines of the formula $R.NH_2$ wherein R has the meanings stated above; and reduction of the correspondingly substituted o-carbamylbenzene sulphonic acids or derivatives thereof for example acid halides and esters thereof with for example a metal reducing agent in an acid medium.

According to a further feature of the invention therefore we provide a process for the manufacture of the 1:2-benzisothiazolones of the invention which comprises disproportionation of 2:2′-dithiobenzamides of the formula:

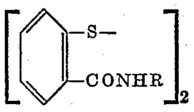

wherein R has the meanings stated above.

Disproportionation may conveniently be carried out by treatment with alkali for example by heating with aqueous sodium hydroxide solution.

According to yet a further feature of the invention we also provide a process for the manufacture of the 1:2-benzisothiazolones of the invention which comprises interaction of 1:2:3-benzodithiole-3-one with amines of the formula $R.NH_2$ wherein R has the meanings stated above.

Interaction may conveniently be carried out by heating the reactants together, preferably in the presence of an inert diluent or solvent, for example ethanol.

As stated above the 1:2-benzisothiazolone derivatives of the invention possess useful antibacterial and antifungal activity. We have found for example that the said 1:2-benzisothiazolones possess high antibacterial activity against gram positive bacteria, for example *Streptococcus pyogenes* K, and gram negative bacteria, for example *Salmonella dublin,* and high antifungal activity against species of fungi which are of economic importance in man and domestic animals, for example *Candida albicans* and *Trichophyton mentagrophytes;* further that they are active over a wide pH range and that their activity is little affected by the presence of for example bile, serum, and the like. We have further found that the said 1:2-benzisothiazolones are suitable for controlling fungal diseases of plants. For example, the disease in oat seedlings caused by *Erysiphe graminis* var. *avenae,* the disease in tobacco seedlings caused by *Peronospora tabacina,* and the disease in wheat seedlings caused by *Puccinia triticina* are each effectively controlled by treatment with representative 1:2-benzisothiazolones of the invention.

According to a further feature of the invention we therefore provide compositions for the control of bacterial and/or fungal growth and for the treatment and/or prophylaxis of bacterial and fungal infections comprising as active ingredient or ingredients at least one of the 1:2-benzisothiazolone derivatives of the invention.

The compositions of the invention include for example standard pharmaceutical formulations of the said active ingredient(s) as known to the arts of human and veterinary medicine and as applicable to the control of bacterial and/or fungal infections of man and animals.

The compositions of the invention also include for example standard formulations of the said active ingredient(s) as known to the arts of horticulture and agriculture and as applicable to the control of fungal diseases of plants.

The 1:2-benzisothiazolone derivatives of the invention may be applied directly or indirectly for the control of bacterial and/or fungal growth and in the prophylaxis and treatment of bacterial and/or fungal infections. They may be so used, for example for the local treatment of dermatophytoses, for example athlete's foot and ringworm of the scalp; as general or urinary antiseptics; for the local treatment of monilial infections, for example monilial vaginitis and thrush; for the treatment of pruritus vulvae; and for the treatment of fungal diseases in plants.

According to a final feature of the invention we provide a method for the prevention and/or treatment of fungal diseases of plants which comprises applying to the said plants a benzisothiazolone derivative of the invention.

The invention is illustrated but not limited by the following examples in which the parts are by weight:

*Example 1*

207 parts of o-chlorothiolbenzoyl chloride, or a solution of 207 parts of o-chlorothiolbenzoyl chloride in 500 parts of carbon tetrachloride, prepared as described below, is added over 30 minutes to a stirred solution of 140 parts of p-chloroaniline in 500 parts of pyridine. During the addition the temperature of the mixture is kept at 25–30° C. by external cooling with ice. When addition is complete the mixture is allowed to stir at 25–30° C. for a further 15 minutes, then it is heated at 75–80° C. for 10 minutes. The hot mixture is added to a stirred mixture of 2500 parts of 3N-hydrochloric acid and ice. The mixture is filtered and the solid residue is washed with water, dried at 50° C. and crystallised from methanol giving 2-p-chlorophenyl-1:2-benzisothiazolone as straw-coloured needles, M.P. 123–124° C.

The o-chlorothiolbenzoyl chloride or the o-chlorothiolbenzoyl chloride-carbon tetrachloride solution used as starting material, are themselves prepared as follows: Dry chlorine is bubbled into a vigorously stirred suspension of 100 parts of finely divided 2:2'-dithiobenzoyl chloride in 500 parts of dry carbon tetrachloride until there is no solid left in suspension. During this time the temperature of the mixture is kept at 15–20° C. by external cooling. The resulting solution is stirred for an additional 15 minutes at 20–25° C., then dry nitrogen is bubbled through until any excess chlorine has been removed. There is thus obtained a solution of o-chlorothiolbenzoyl chloride (121 parts) in carbon tetrachloride which may be used directly as a starting material in the above reaction. Alternatively, this solution may be evaporated under reduced pressure until all the carbon tetrachloride is removed. There is thus obtained o-chlorothiolbenzoyl chloride M.P. 67–68° C.

In like manner to that described above but using, in place of p-chloroaniline, respectively o-chloroaniline, m-chloroaniline, p-bromoaniline, 3:4-dichloroaniline, 2:5-dichloroaniline, p-anisidine, o-anisidine, m-anisidine, p-ethoxyaniline, p-butoxyaniline, 2:5-dimethoxyaniline, p-n-butylaniline, p-n-dodecylaniline, 2:4-dimethylaniline, 2:5-dimethylaniline, 2:6-dimethylaniline, 3:4-dimethylaniline, 2:6-diethylaniline, p-acetamidoaniline, p-dimethylaminoanaline, tertbutylamine, dodecylamine, cetylamine, heptadecylamine, octadecylamine, p-chlorobenzylamine, o-chlorobenzylamine, 2:6-dichlorobenzylamine, 2:4:5-trichlorobenzylamine, α-aminopyridine, 5-bromo-2-aminopyridine, γ-aminopyridine, 2-aminopyrimidine and 2-amino-4:6-dimethylpyrimidine, there are obtained 2-o-chlorophenyl-1:2-benzisothiazolone, M.P. 135–136° C.; 2-m-chlorophenyl-1:2-benzisothiazolone, M.P. 134–135° C.; 2-p-bromophenyl-1:2-benzisothiazolone, M.P. 133–135° C.; 2-(3':4'-dichlorophenyl)-1:2-benzisothiazolone, M.P. 185–186° C., 2-(2':5'-dichlorophenyl)-1:2-benzisothiazolone, M.P. 163–164° C.; 2-p-methoxyphenyl-1:2-benzisothiazolone, M.P. 145–146° C.; 2-o-methoxyphenyl-1:2-benzisothiazolone, M.P. 135–136° C.; 2-m-methoxyphenyl-1:2-benzisothiazolone, M.P. 116–118° C.; 2-p-ethoxyphenyl-1:2-benzisothiazolone, M.P. 136–137° C.; 2-p-n-butoxyphenyl-1:2-benzisothiazolone, M.P. 90–91° C.; 2-(2':5'-dimethoxyphenyl)-1:2-benzisothiazolone, M.P. 173–174° C.; 2-p-n-butylphenyl-1:2-benzisothiazolone, M.P. 60–61° C.; 2-p-n-dodecylphenyl-1:2-benzisothiazolone, M.P. 85–86° C.; 2-(2':4'-dimethylphenyl)-1:2-benzisothiazolone, M.P. 138–139° C.; 2-(2':5'-dimethylphenyl)-1:2-benzisothiazolone, M.P. 117–118° C.; 2-(2':6'-dimethylphenyl)-1:2-benzisothiazolone, M.P. 147–148° C.; 2-(3':4'-dimethylphenyl)-1:2-benzisothiazolone, M.P. 161–162° C.; 2-(2':6'-diethylphenyl)-1:2-benzisothiazolone, M.P. 118–119° C.; 2-p-acetoamidophenyl-:2-benzisothiazolone, M.P. 249–250° C. (and, by hydrolysis of this, 2-p-aminophenyl-1:2-benzisothiazolone, M.P. 230–231° C.); 2-p-dimethylaminophenyl-1:2-benzisothiazolone, M.P. 188–9° C., 2-tert-butyl-1:2-benzisothiazolone, B.P. 142° C./0.5 mm.; 2-dodecyl-1:2-benzisothiazolone, a waxy solid; 2-cetyl-1:2-benzisothiazolone, a waxy solid; 2-heptadecyl-1:2-benzisothiazolone, a waxy solid, 2-octadecyl-1:2-benzisothiazolone, M.P. 51–52° C.; 2-p-chlorobenzyl-1:2-benzisothiazolone, M.P. 97–98° C.; 2-o-chlorobenzyl-1:2-benzisothiazolone, M.P. 107–108° C.; 2-(2':6'-dichlorobenzyl)-1:2-benzisothiazolone, M.P. 163–164° C.; 2-(2':4':5'-trichlorobenzyl)-1:2-benzisothiazolone, M.P. 175–176° C.; 2-α-pyridyl-1:2-benzisothiazolone, M.P. 195–196° C.; 2-(5'-bromopyrid-2'-yl)-1:2-benzisothiazolone, M.P. 232–233° C.; 2-γ-pyridyl-benzisothiazolone, M.P. 182–183° C.; 2-(pyrimid-2'-yl)-1:2-benzisothiazolone, M.P. 236–237° C.; and 2-(4':6'-dimethylpyrimid-2'-yl)-1:2-benzisothiazolone, M.P. 252–253° C.

*Example 2*

713 parts of o-bromothiol-N-p-chlorobenzylbenzamide are added to 1750 parts of glacial acetic acid. The resulting mixture is heated under reflux until there is no solid left in suspension. The solution is added to 4,000 parts of ice and aqueous 32% sodium hydroxide solution is added until the mixture is alkaline to Brilliant Yellow paper. During the addition of the sodium hydroxide solution, further ice is added as necessary so that the temperature of the mixture does not exceed 10° C. The mixture is then filtered and the residue is washed with water, dried at 50° C. and crystallised from methanol or cyclohexane. There is thus obtained 2-p-chlorobenzyl-1:2-benzisothiazolone as colourless prisms, M.P. 97–98° C.

The o-bromothiol-N-p-chlorobenzylbenzamide used as starting material is itself prepared as follows: 553 parts of N:N'-bis - p - chlorobenzyl - 2:2' - dithiobenzamide are passed through a 60-mesh sieve and then suspended in 1000 parts of dry carbon tetrachloride. 160 parts of bromine are added to the vigorously stirred suspension at a rate such that the temperature of the mixture does not exceed 25° C. The mixture is then stirred for 30 minutes at 23–25° C. and filtered. The solid residue is washed with carbon tetrachloride leaving o-bromothiol-N-p-chlorobenzylbenzamide on the filter.

The N:N'-bis-p-chlorobenzyl-2:2'-dithiobenzamide is itself prepared as follows: A solution of 100 parts of p-chlorobenzylamine in 150 parts of chloroform is added during 15 minutes to a stirred solution of 61 parts of 2:2'-dithiobenzyl chloride in 2000 parts of chloroform. During the addition, the temperature of the mixture is kept at 20–25° C. by external cooling. The mixture is then stirred for one hour at 20–25° C. and filtered. The solid residue is digested with 1000 parts of boiling water and the resulting hot mixture is filtered. The residue is then washed with water and dried at 90° C. giving N:N'-bis-p-chlorobenzyl-2:2'-dithiobenzamide as a white powder, M.P. 234–235° C.

*Example 3*

A mixture of 10 parts of N:N'-bis-p-chlorobenzyl-2:2'-dithiobenzamide and 100 parts of aqueous 5% sodium hydroxide is boiled under reflux for 1 hour. The mixture is cooled at 20–25° C. and then filtered. The solid residue is digested with 300 parts of cold benzene and the mixture is filtered. The latter filtrate is evaporated on the steam bath leaving a residue, which solidifies on cooling, of 2-p-chlorobenzyl-1:2-benzisothiazolone, M.P. 96–98° C.

*Example 4*

A mixture of 168 parts of 1:2:3-benzodithiole-3-one, 142 parts of p-chlorobenzylamine and 600 parts of ethanol is boiled under reflux for 16 hours. The mixture is cooled to 20° C. and filtered giving a solid residue of 2-p-chlorobenzyl-1:2-benzisothiazolone, M.P. 96–98° C.

*Example 5*

1 part of 2-p-chlorobenzyl-1:2-benzisothiazolone, 66.5 parts of arachis oil, 11 parts of anhydrous lanolin, 17 parts of soft paraffin and 5.5 parts of hard paraffin are thoroughly mixed giving a mixture suitable for topical application for therapeutic purposes.

*Example 6*

1 part of 2-p-chlorobenzyl-1:2-benzisothiazolone and 99 parts of isopropanol are thoroughly mixed giving a mixture suitable for topical application for therapeutic purposes.

*Example 7*

A mixture of 0.5 part of 2-p-chlorobenzyl-1:2-benzisothiazolone, 10 parts of anhydrous citric acid, 4.23 parts of lactose and 0.02 part of sodium di-isopropylnaphthalene sulphonate is granulated with a sufficient quantity of ethanol. The granules are passed through a 16-mesh screen and dried at a temperature not exceeding 60° C. A mixture of 2.85 parts of anhydrous sodium carbonate, 2 parts of anhydrous sodium sulphate and 0.4 part of magnesium stearate is screened through a 20-mesh screen and mixed with the granules. The mixture is compressed between capsule-shaped punches and there are thus obtained pessaries suitable for therapeutic purposes.

*Example 8*

70 parts of glycerine are added to a mixture of 2.5 parts of micropulverized 2-p-chlorobenzyl - 1:2-benzisothiazolone, 13.5 parts of water and 14 parts of gelatine. The resultant mixture is warmed to 75° C. with stirring, then poured into moulds lubricated with liquid paraffin. There are thus obtained suppositories suitable for therapeutic purposes.

*Example 9*

One part of 2-p-chlorobenzyl-1:2-benzisothiazolone is mixed with a mixture of 60 parts of polyethylene glycol 400 and 39 parts of polyethylene glycol 4000 and the mixture is warmed with stirring until it is homogeneous. The mixture is stirred until cool and there is thus obtained an ointment suitable for topical application for therapeutic purposes.

*Example 10*

5 parts of micropulverised 2-p-chlorobenzyl-1:2-benzisothiazolone, 70 parts of boric acid and 25 parts of starch are thoroughly mixed. There is thus obtained a powder suitable for topical administration by insufflation for therapeutic purposes.

*Example 11*

A mixture of 120 parts of anhydrous citric acid and 50 parts of 2-p-chlorobenzyl-1:2-benzisothiazolone is compressed into granules and passed through a 16-mesh screen. 75 parts of sodium bicarbonate are granulated with a sufficient quantity of a solution of equal parts of 95% ethanol and water and these granules are passed through a 16-mesh sieve and are then dried at 60° C. The two granular products are then mixed and 5 parts of boric acid are added. The mixture is compressed and there are thus obtained effervescent solution tablets for topical use for therapeutic purposes.

*Example 12*

To 1.05 parts of absorbent gauze there is added a solution of 0.01 part of 2-p-chlorobenzyl-1:2-benzisothiazolone in 3.5 parts of ethanol. The gauze is dried and formed into a tampon suitable for use for therapeutic purposes.

*Example 13*

1 part of 2-p-chlorobenzyl-1:2-benzisothiazolone and 99 parts of dimethylsulphoxide are thoroughly mixed giving a mixture suitable for topical application for therapeutic purposes.

*Example 14*

1.05 parts of 2-p-chlorobenzyl-1:2-benzisothiazolone, 85 parts of 2:2-dimethylpropane-1:3-diol, 7 parts of propylene glycol, and 12 parts of glycerol are thoroughly mixed giving a mixture suitable for topical application for therapeutic purposes.

*Example 15*

A mixture of 1 part of 2-(2':6'-dimethylphenyl)-1:2-benzisothiazolone, 1 part of a dispersing agent comprising a mixture of disodium methylene-dinaphthalene-β-sulphonic acid and sodium naphthalene-β-sulphonic acid, and 80 parts of water is ground in a ball mill to give a dispersion. 9 parts of this dispersion are added to 1000 parts of water containing 0.15 part of a non-ionic surface active agent comprising an alkyl phenol condensed with ethylene oxide. This mixture is sprayed on oat seedlings which are subsequently inoculated with spores of *Erysiphe graminis* var. *avenae* and kept in an environment conducive to spore germination and infection. Complete control of the disease is obtained.

*Example 16*

A mixture of 1 part of 2-(2':4'-dimethylphenyl)-1:2-benzisothiazolone, 1 part of a dispersing agent comprising a mixture of disodium methylene-dinaphthalene-β-sulphonic acid and sodium naphthalene-β-sulphonic acid, and 80 parts of water is ground in a ball mill to give a dispersion. 45 parts of this dispersion are added to 1000 parts of water containing 0.15 part of a non-ionic surface active agent comprising an alkyl phenol condensed with ethylene oxide. This mixture is sprayed on tobacco seedlings which are subsequently inoculated with spores of *Peronospora tabacina* and kept in an environment conducive to spore germination and infection. 95% control of the disease is obtained.

*Example 17*

A mixture of 1 part of 2-p-n-butylphenyl-benzisothiazolone, 1 part of a dispersing agent comprising a mixture of disodium methylene-dinaphthalene-β-sulphonic acid and sodium naphthalene-β-sulphonic acid, and 80 parts of water is ground in a ball mill to give a dispersion. 9 parts of this dispersion are added to 1000 parts of water containing 0.15 part of a non-ionic surface active agent comprising an alkyl phenol condensed with ethylene oxide. This mixture is sprayed on wheat seedlings which are subsequently inoculated with spores of *Puccinia triticina* and kept in an environment conducive to spore germination and infection. Complete control of the disease is obtained.

What we claim is:

The compound 2-p-chlorobenzyl-1:2 benzisothiazolone.

References Cited in the file of this patent

UNITED STATES PATENTS

| | | |
|---|---|---|
| 2,610,190 | Chao et al. | Sept. 9, 1952 |
| 2,870,015 | Allen et al. | Jan. 20, 1959 |
| 2,877,155 | Metivier | Mar. 10, 1959 |

OTHER REFERENCES

McClelland et al.: J. Chem. Soc., 1926, pages 921–5.

Bartlett: Chem. Abstracts, vol. 28, col. 5440 (1934).

Fowkes: Chem. Abstracts, vol. 39, col. 4608 (1945).

Frear et al.: J. of Economic Entomology, vol. 40, pages 736–741 (1947).

McClelland et al.: Chem. Abstracts, vol. 42, col. 908 (1948).

Mustafa et al.: Chem. Abstracts, vol. 47, col. 1129 (1953).